United States Patent [19]

Suzuki et al.

[11] Patent Number: 4,694,232
[45] Date of Patent: Sep. 15, 1987

[54] ROBOT CONTROLLING SYSTEM

[75] Inventors: Hayao Suzuki; Yoshiharu Matsuoka, both of Koto, Japan

[73] Assignee: Seiko Instruments & Electronics Ltd., Tokyo, Japan

[21] Appl. No.: 755,615

[22] Filed: Jul. 16, 1985

[51] Int. Cl.4 .............................................. G05B 19/42
[52] U.S. Cl. .................................. 318/568; 364/513; 901/3
[58] Field of Search ........................ 318/568; 364/513; 901/3, 4, 5

[56] References Cited

U.S. PATENT DOCUMENTS 4,146,924  3/1979  Birk et al. ....................... 318/568 X
4,287,459  9/1981  Dahlstrom ....................... 318/568 A
4,408,286  10/1983  Kikuchi et al. ................. 318/568 X
4,490,660  12/1984  Tsuchihashi .................... 318/568 D
4,562,551  12/1985  Inaba et al. ..................... 318/568 X Primary Examiner—Benjamin Dobeck
Attorney, Agent, or Firm—Bruce L. Adams; Van C. Wilks

[57] ABSTRACT

A system that utilizes a robot for a loading operation of articles of works in a machine; a depalletizing operation for taking out the articles or the works one by one which are stacked up in a magazine at an assembly work station and a palletizing operation for stacking up the articles or the works one by one which are machined or assembled.

12 Claims, 7 Drawing Figures

DEPALLETIZING          PALLETIZING

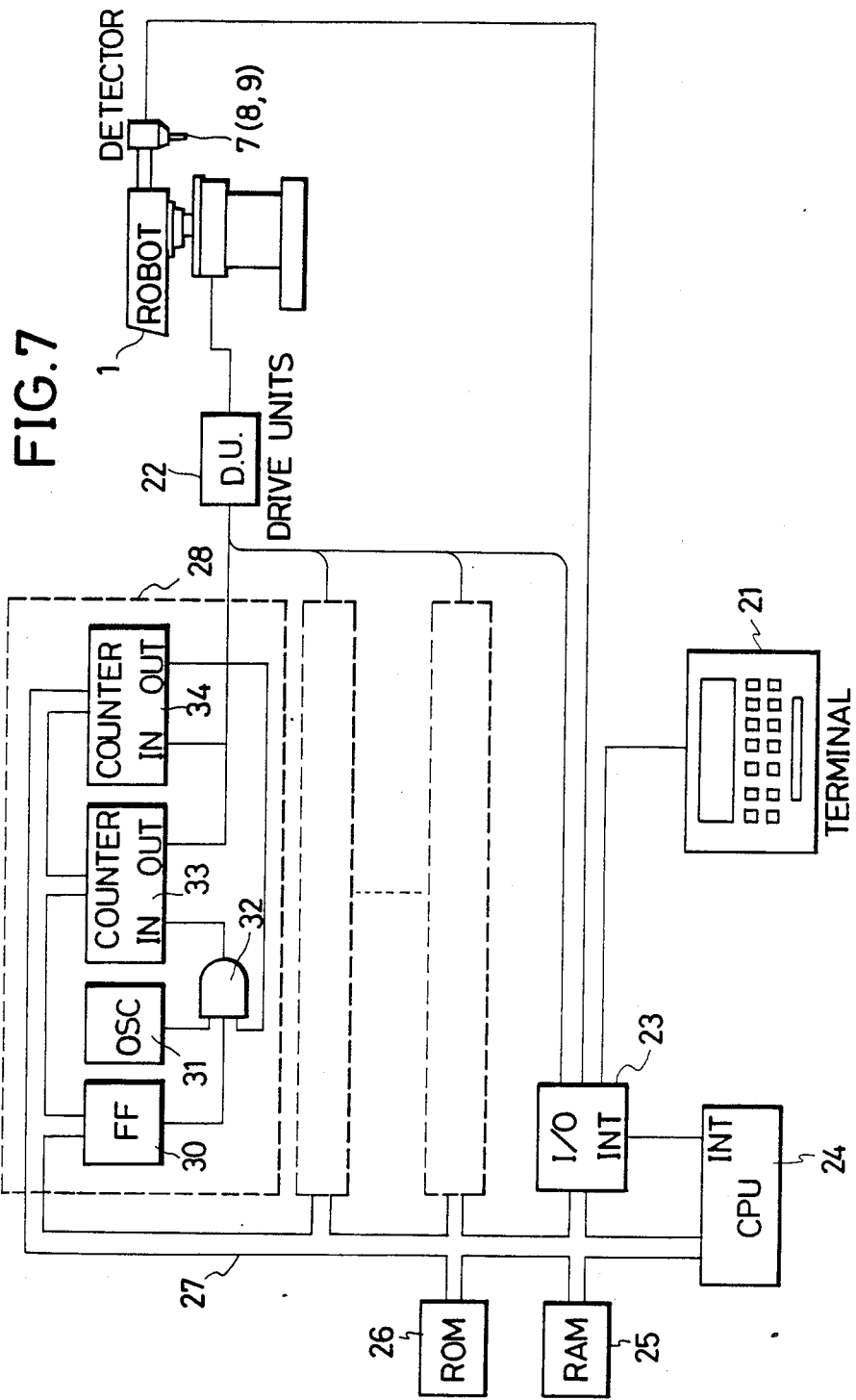

ROBOT CONTROLLING SYSTEM

BACKGROUND OF THE INVENTION

Various types of robots operational highly for general purpose which are driven by servomotor, servo valve and the like, provided with a plurality of operating axes working as indicated by a controller are developed currently to a full play for labor lessening and working rationalization. There is, for example, a system disclosed in a Japanese laid-open Pat. No. 58-182707. However, there is left many a problem still with the controlling system, it can hardly be said that a performance of the robot mechanism operational highly for general purpose is given a full play practically, and the controlling system is not serviceable for operating robots. This invention is to provide a controlling system whereby such existing condition will be reformed.

It is necessary to indicate an operating point to a robot for operation, wherefore a method according to teaching, a method according to numerical command, and a method according to both teaching and numerical command are prevailing practically, and this invention is workable on any of these methods.

SUMMARY OF THE INVENTION

An object of this invention is to do surely and speedily a loading operation of articles or works in a machine by means of a robot, a depalletizing operation for taking out the articles or the works one by one which are stacked up in a magazine at assembling work, and a palletizing ooeration, on the contrary, for stacking up the articles or the works one by one which are machined or assembled.

BRIEF DESCRIPTION OF THE DRAWINGS

Figs. 6 and 7 are block diagrams showing the control system that practices the controlling method of the embodiment of the present invention.

DETAILED DESCRIPTION OF INVENTION

Problems will be described of the robot system for depalletizing and palletizing operations according to FIG. 1, for example.

Figure 1:
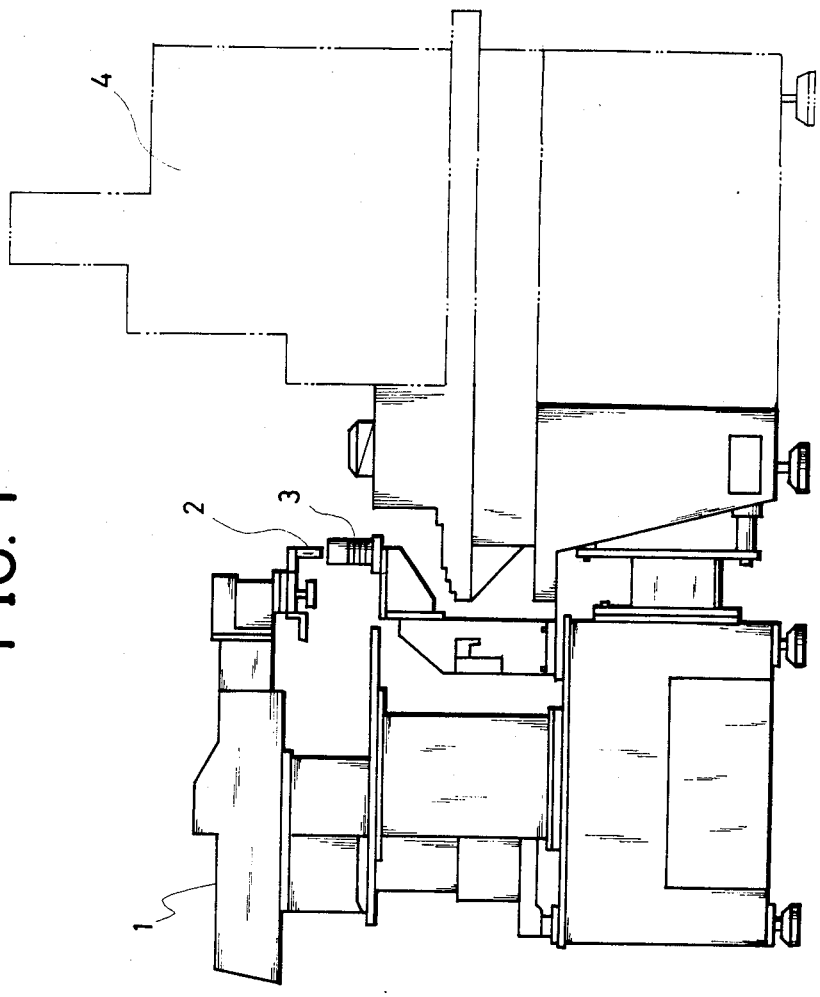
FIG. 1 a side view of a general robot system for palletizing and depalletizing operations.

In a system of FIG. 1, a robot 1 grasps articles or works one by one which are stored in succession or stacked up vertically in a magazine 3 with a hand 2 and loads them into a machine 4. The works wrought on the machine 4 are demounted, on the contrary, from the machine 4 by the hand 2 of the robot 1 and stored in succession or stacked up vertically in a similar magazine.

At the time of vertical palletizing and depalletizing operations as above, the works are located generally by having the position shifted, one by one, vertically for height of the work. However, the work is generally not so high in precision, and there may be a case where foreign matters are caught between the works, thus the works are actually not stacked up at equal pitches, further the errors are accumulated, therefore when the hand ends locating, the hand is capable of depressing the works or failing in grasping the works.

In view of the existing circumstances above, this invention comprises providing a detector for detecting works on a nose of the hand, thereby ensuring and accelerating the palletizing and depalletizing operations. Further, the operations are ensured accordingly irrespective of the quantity of works loaded in the magazine at first. Moreover, operation data to be stored for the operations can be minimized.

Figure 2:
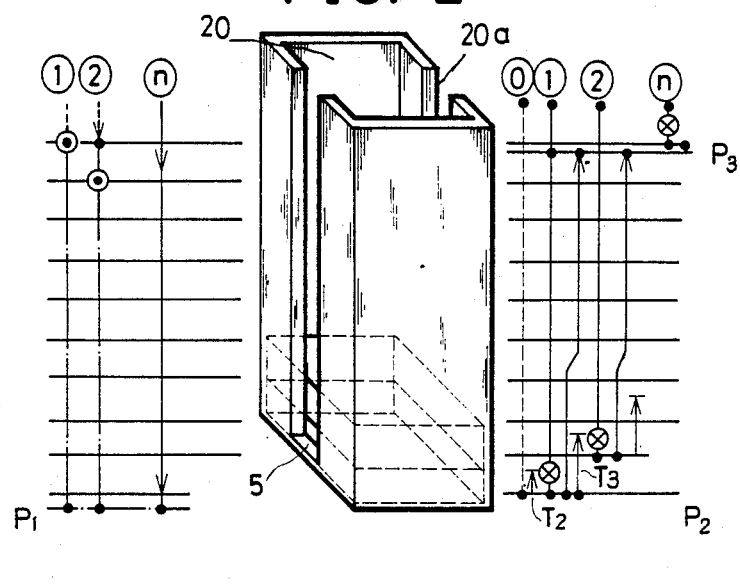
FIG. 2 is an explanatory drawing of movement at the time of vertical palletizing and depalletizing operations according to this invention.
Figure 3:
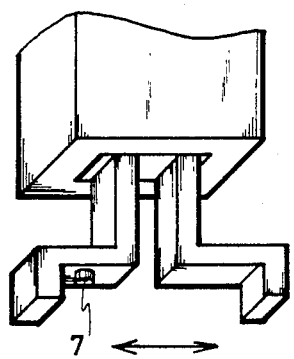
FIG. 3 and FIG. 5 are perspective views of hands used for the operations of FIG. 2 and FIG. 4.

FIG. 2 represents a magazine at the time of vertical depalletizing and palletizing operations like the system of FIG. 1 and a move of the hand to the magazine, and a hand of FIG. 3 can be used for the operations. The hand is capable of moving in a groove 20a provided vertically on a magazine 20 and also grasping a work 5 in the magazine. In FIG. 2, a point indicated by mark ● is a grasping position at the time of depalletizing and mark ⊗ is a releasing position at the time of palletizing.

A detector 7 is mounted on the hand and when it detects the work 5 and thereby a work detection signal is inputted, the hand stops immediately or moves a little further so as to be able to grasp the work 5.

In the case of depalletizing, it is unknown at first how far the first work is stacked up in the magazine, therefore the hand is initially moved from the uppermost part toward the lowermost at a relatively moderate or lower speed so that it may stop without colliding with the work when the work is detected on the detector 7. In FIG. 2, moving distance where it moves at the lower speed is indicated by a dotted line. When it moves as far as a spot whereat the work is stacked up, the detector 7 detects the work, and a signal detection is inputted to a controller of the robot. Upon receipt of the signal input, the robot controller stops the hand moving. Stopping a movement of the hand on the signal input is effected according to a usual technique from employing LSI such as CPU, I/O port or the like which is used on a controller. A further detail will be given hereinafter of the control system.

After stopping the movement, the robot controller stores a self-taught data representative of a stop position in a position memory according to an automatic self-teaching instruction. It is a matter of course that the robot controller stores the stop position of the hand at every time, it is a usual technique to automatically store it in the position memory, and a further description will be made later. After self-teaching, the work can be grasped very securely by the hand.

A position data self-teaching as above is used for carry out speedily the operation when the next work is taken out. The work is already not present at a first work takeout point indicated by the self-taught position data, therefore the hand can be moved free till the position indicated by the self-taught position data at higher speed. It is then moved toward the lowermost part likewise at the lower speed moderate enough to stop without collision, exactly the same operation as the first is carried out thereafter, and a high-speed move operating point at the time of next work takeout is self-taught. Since the position where to take out the work becomes deep at every operations, a moving distance gets long, however, only the high-speed moving distance by the self-teaching gets long, therefore a general time will not be increased so long.

The work on the lowermost part cannot be gripped securely unless a moving target position P1 of the robot hand comes lower than the position whereat the lowermost part work can be grasped. Accordingly, the last operation is to ensure nonexistence of the work, and if so ensured, the empty magazine is removed to another area, and another magazine enclosing the works therein is prepared. Or the operation is shifted, as specified separately, to that for recommencing likewise takeout of the works enclosed in another magazine. Such operation is controlled generally by a computer. Since it can be carried out on the same means as conditional jump function, a further description will be given later with reference to FIGS. 6 and 7.

In the case of palletizing, it is also unknown at first how far the works are stacked up in the magazine, so it is necessary to check a quantity of the works before grasping. An operation of palletizing is depicted in the right hand of FIG. 2, and in a principle operation, P2 is a target which the hand is initially moved to at a lower speed moderate enough to stop without collision when the work is detected, and the position at the time of detection and stop is self-taught. The robot then returns to the position where the work is placed to grasp the work, makes the hand grasp the work thereon, moves it at higher speed as high as a point T3 higher than the self-taught point, and, then releases the hand to drop the work. T3 is a predetermine value or a distance vector whereat a dispersion in a height direction of the work precision and others is taken into consideration and is hence selected so as not to mar the work dropped from a position shifted by the distance. The self-taught point and T3 are handled as vector for data of the controller and shifted by an addition of the vector.

In FIG. 2, the case of palletizing is such that the magazine is empty at first, and the work is not detected despite reaching a target point. Different from the case of detection and stop, a vector operation is carried out, in this case, to shift a distance vector T2 shorter by a pitch of one work than T3 from P2, and with the point thus obtained as a target value, the hand is moved at high speed likewise to drop the work.

When the hand detects the work, it moves further to the target P2 at a speed moderate enough to stop without collision, stops upon detection of the work, self-teaches the stop position, and then T3 is subjected to a vector operation to the self-taught point, the result of which is regarded as the next work releasing point. Further, when the works are stacked up full, it is moved at high speed for detection of the work to the target of position P3 where the work can be detected on the detector 7. When the work is not detected despite reaching the target position P3, the situation is such that the magazine is not full, which is ready for palletizing next, rherefore a similar work stacking-up operation is commenced. Thus, after the works are stacked up full in the magazine, a height of the stacked last work is detected, which is self-taught, and since the work is already detected, the hand is not moved at high speed to the target P3. Thus, it can be detected that the magazine is full of works, and the magazine can be replaced with next one, or another magazine can be palletized.

Figure 4:
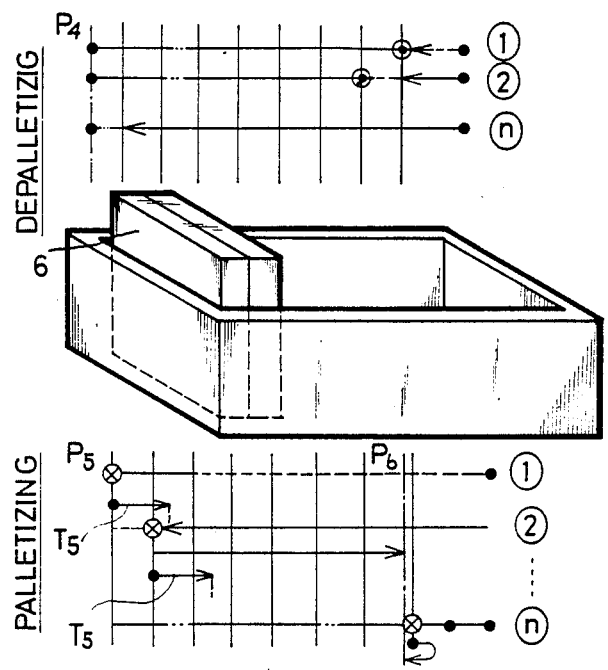
FIG. 4 is an explanatory drawing of movement at the time of horizontal palletizing and depalletizing operations according to this invention.
Figure 5:
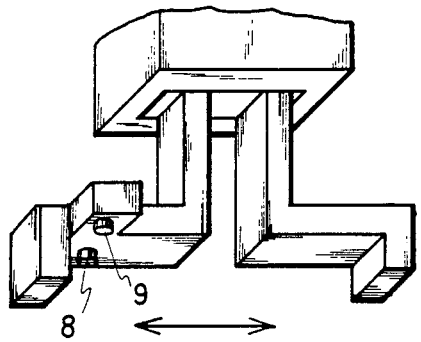

FIG. 4 and FIG. 5 are a performance drawing of depalletizing and palletizing when the works are kept close horizontally each other and an illustration of a hand used therefor, respectively.

In FIG. 5, two detectors are mounted on the hand, a detector 8 is intended for depalletizing, while a detector 9 is intended for palletizing.

What is different from that of FIG. 2 is that the depalletizing operation is given horizontally in direction instead of vertically, and particularly in detection and move operations, the difference is that a linear movement in a horizontal plane is required, and other operation sequence remains exactly the same as FIG. 2.

The linear movement is prevailing generally in operation, for which a further description will not be necessary.

The palletizing operation is effected by means of the detector 9. With the work grasped thereon, the hand is moved to the target of a position P5 whereat the work on an extremely left end is placed until the work is detected at a lower speed moderate enough to stop without collision when the work is detected in a linear interpolation and also close to the detected work.

In palletizing of FIG. 4, the situation is such that the magazine is empty at first, and thus the hand reaches a target point without detection and stop. After reaching the target point, the position shifted by a predetermined value that is a vector T5 is subjected to a vector operation, and to the resultant position the hand moves at higher speed with the work grasped thereon at the time of next palletizing. After the movement, P5 is moved to the target until the work is detected at a lower speed moderate enough to stop without collision and also close to the detected work. After detection and stop, the stop position is self-taught. The position shifted by the vector T5 is subjected to a vector operation, and the above self-taught point is used for obtaining the next work-grasped high-speed move point. After self-teaching, the hand is moved at high speed toward the target of a point P6 until the work is detected. The point P6 is selected so as to allow a secure work detection when the works are fed full. When the work is not detected despite arrival at P6, the situation is such that there yet remains an allowance to accept the work, therefore the similar palletizing operation will be kept going on.

When the hand is commanded to move toward the target of P6 until the work is detected despite the full state of works, it does not move as the work has already been detected, thus indicating the full state. Accordingly, the magazine will be replaced with the next one, or an operation for palletizing a separate magazine can be executed.

In the vertical palletizing of FIG. 2, if a detector capable of detecting the work one pitch lower further than the detector 7 can be installed on the hand, then it can be operated without a work quantity detecting operation as in the case of horizontal palletizing of FIG. 4.

In the above depalletizing and palletizing operations, the work must be moved linearly, and also the spatial work posture must be constant. To keep the spatial work posture constant, those orthogonal coordinate type, cylindrical coordinate type and horizontal articulated type (scalar type) which have a vertical operating axis all are operational without a problem for moving vertically. In a robot articulated vertically, a technique for keeping the work posture constant is already known and so prevailing.

For moving horizontally, the orthogonal coordinate type is operational unconditionally, and those of cylindrical coordinate type and horizontal articulated type (scalar type) are also operational subject to providing an operating axis for rotating the hand within a horizontal plane and controlling for the summation of horizontal turning angles coming always at zero.

Figure 6:
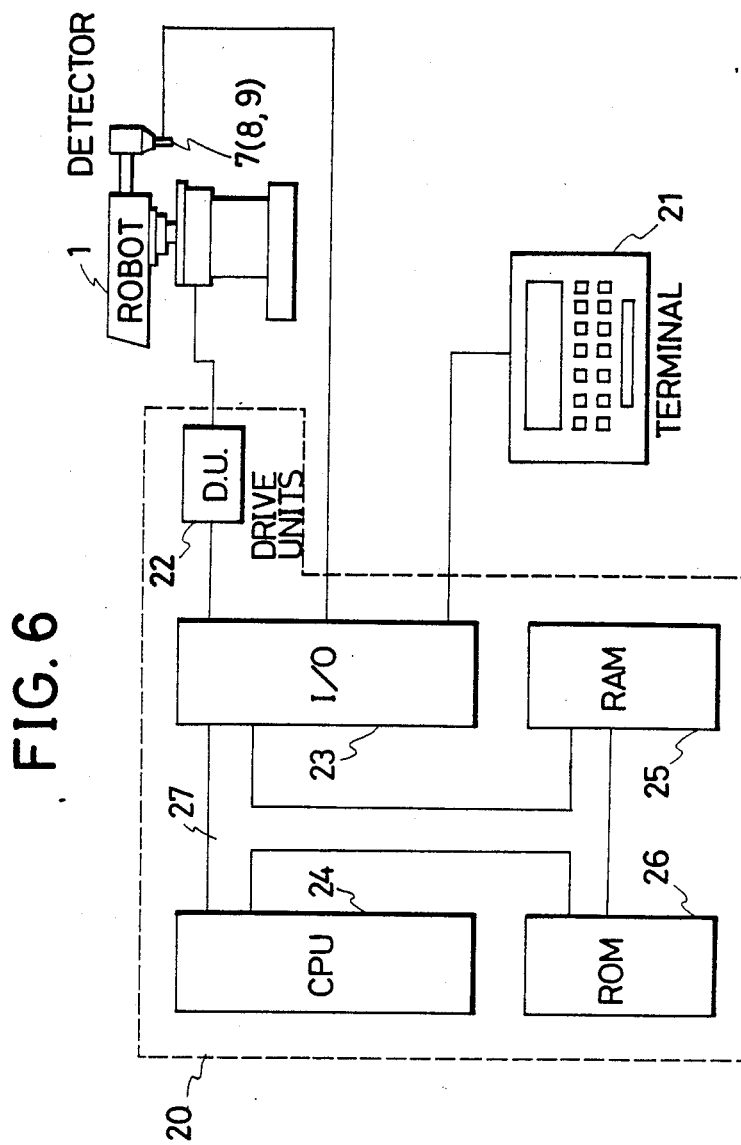

An embodiment of the control system for controlling an embodiment of the present invention as above-mentioned, is shown in a block diagram of FIG. 6.

This control system comprises a controller 20 which controls the robot having plural operating axes and a terminal 21 which is provided with a key board and a display device to program the operation sequence data of the robot and keys which conducts jogging to the robot so that it can teach the operating position of the robot.

The controller 20 comprises a plurality of drive units which control the driving source such as motor and the like so as to drive a plurality of operating axes of the robot according to the operation sequence data; an input-output control portion (I/O) 23 which is composed of an LSI and the like so as to execute sending and receiving of the input signal from the terminal 21 and of the output signal displayed on the terminal, sending and receiving of the transfer movement command pulse according to the operation data stored in the RAM and of the control signal such as the detecting signal of the over-load of the motor, which are respectively applied between the drive units and thereof, sending and receiving of the operating signal of the hand, receiving of the condition signal of the robot and sending and receiving of the signal from the peripheral devices around the robot; a CPU 24 which is operable to execute processing of the signal from the input-output control portion 23, controlling reading-out and/or storing of the data between the memory device composed of a RAM and a ROM, and operating the coordinate operation and/or logical operation of the robot; a RAM 25 which memorizes such data as the program data processed by the CPU 24, or robot operating position data, in accordance with the program signal from the terminal 21; and a ROM 26 which memorizes the procedure for executing each of the orders of the program data stored in the RAM 25.

The detection signal from detectors 7, 8, and 9, are respectively connected to the input-output control portion 23 as in the other input means. It is able to be checked by the logic operation function of the CPU 24 whether or not the signal detection level of each of the detectors 7, 8, and 9 all coincide with the respectively specified predetermined levels stored in the RAM.

Accordingly, in a mode wherein the movement of the hand stops, when the detected signal reaches its designated level while the hand is on its way toward a target position in accordance with the movement command, the CPU repeats alternately processing for outputting a movement command pulse of the operation axis of the robot (processing for outputting pulse) and processing for checking the coincidence of the signal level from the detector and the designated signal level (processing for checking input) and when the designated signal level is detected by processing for checking input, the CPU produces a control signal to stop the movement of the hand by finishing the processing for outputting pulse.

If the designated signal level is not detected even when the hand reaches the target position, it can be transferred to another designated operation by the logic discriminating function and the jumping function of the CPU 24.

As set forth above, though it includes the case wherein it stops in accordance with the input signal of the detector, the amount of the pulse of the movement command which is applied to the operation axis is normally stored in the RAM 25 as the self-taught data, therefore the self-taught data representative of the present stop position of the operation axis of the robot is normally readable through the CPU 24 and the present stop position can be replaced with the next operation position of the robot. This is a very fundamental function of the CPU 24.

The function to operate the vector of the coordinate value is obtained by designating the self-taught data representaive of the present position of the robot in the orthogonal coordinate system and by calculating updated operation data representative of each of the X,Y,Z coordinate values.

Furthermore, the I/O 23, CPU 24, RAM 25, ROM 26 are connected by a bus 27 so as to be operable to send and receive the data therebetween.

FIG. 7 is an embodiment of the control system in which the outputting of the moving signal or the command pulse of the movement operation applied to the drive unit 22 can be speeded up, and also the reception response of the signal of the detector 7 can be speeded up, wherein the terminal 21, RAM 25, ROM 26 in the drawing are the same as in FIG. 6.

In FIG. 7, in order to output the movement pulse order to apply to the drive unit 22, a movement control circuit 28 is provided for each of the operating axes.

In the movement control circuit 28, the movement pulse number is set in a counter 34, and the cycle of the movement pulse order that is in inverse-proportion to the movement pulse speed is set in a counter 33. Both of the counters 33, 34 are set from the CPU 24 through the bus 27. In the counter 34, reduction counting is executed when the pulse is applied to the input terminal IN, and when the content becomes zero, the output terminal OUT becomes at a low level. In the counter 33, the quotient obtained by dividing the input pulse number with the set number, becomes the output pulse number. Counter 34 is also a kind of a peripheral LSI for microcomputers whose content can be outputted to the bus. Oscillator 31 is an oscillator with a certain frequency number and a flip-flop 30 is controlled in accordance with orders from the computer.

After the movement amount and the pulse cycle are set as above mentioned, when the flip-flop 30 is switched on by the CPU 24, the pulse with certain frequency number is produced from an AND gate 32, and is applied to the counter 33, and the output of the counter 33 is applied to the input of drive unit 22 and to the input of counter 34.

When the counter 34 counts just the set movement amount, the output thereof becomes low-level, and closes the AND gate 32 and the pulse output applied to the drive unit 22 stops.

Accordingly, it can output the pulse to the drive unit 22 by the pulse number ordered by the CPU 24 and with the frequency number ordered by the CPU 24.

In addition, as it is composed of hardwares, a very high frequency number can be outputted. I/0 23 is a kind of LSI for micro-computers and when the polarity designated by the micro-computer is applied thereto, the interruption input is applied to the CPU 24.

Accordingly, by setting the designated level of the output of the detectors 7, 8, and 9 to the I/0 23, when the output of the detectors 7, 8, and 9 reach the designated level, the interruption immediately occurs to the CPU 24 and even when the CPU is executing other processing, it is possible to close the flip-flop 30 immediately and to immediately stop the order pulse output applied to the drive unit 22.

At this time, the content of the counter 34 is not zero, but the data of the pulse which corresponds to the difference between the present position and the target position, remains in the counter. This data can be fed from the counter 34 to the CPU 24 through the bus 27, as mentioned above, and by reducing the distance corresponding to this data from the target value, the self-taught data representative of the present position can be calculated.

Therefore, by utilizing the control system shown in the block diagram of FIG. 7, it becomes possible to move the operating portion at a higher speed and to stop the pulse more rapidly when the designated level of the designated signal is detected.

As herein described, according to this invention, the palletizing and depalletizing operations for which a robot is operational accordingly can be ensured at high speed, and thus the economical effect is notable.

We claim:

1. In a robot controlling system having a robot hand which moves through a moving distance relative to articles stored in succession and is sequentially operated by a drive unit in response to operation data, the improvement comprising: detecting means for detecting the distance between the hand and the article and producing a corresponding detection signal during the movement of the hand toward the article; first controlling means responsive to the detection signal and connected to the drive unit for producing a control signal effective to stop the movement of the hand when the level of the detection signal reaches a predetermined level and for producing present self-taught data based on the control signal; memory means connected to the first controlling means for storing the present self-taught data representative of the stop position of the hand; and second controlling means responsive to the present self-taught data stored in the memory means and connected to the drive unit for controlling the movement of the hand based on the operation data and for calculating updated operation data representative of the next moving distance of the hand based on the present self-taught data so as to effect the movement of the hand at a higher speed toward the article through the next moving distance and thereafter effect the movement of the hand at a lower speed until the hand stops in response to the control signal produced by the first controlling means.

2. A robot controlling system according to claim 1; wherein the second controlling means includes means for producing operation data effective to control the hand to depalletize a set of articles and for calculating updated operation data representative of the next moving distance of the hand based on the present self-taught data.

3. A robot controlling system according to claim 2; wherein the second controlling means includes means for producing initial operation data effective to control the hand to move toward the first article to be depalletized at the lower speed.

4. A robot controlling system according to claim 2; wherein the second controlling means includes means for producing operation data effective to control the hand to depalletize another set of articles unless a control signal is produced by the first controlling means.

5. A robot controlling system according to claim 1; wherein the second controlling means includes means for producing operation data effective to control the hand to palletize the articles and for calculating updated operation data representative of the next moving distance of the hand by subtracting a predetermined value from the present self-taught data.

6. A robot controlling system according to claim 5; wherein the second controlling means includes means for producing operation data for the initial movement of the hand effective to control the hand to move at the lower speed through the whole moving distance.

7. A robot controlling system according to claim 5; wherein the second controlling means includes means for producing operation data effective to control the hand to palletize another set of articles after the hand palletizes the last of a preceding set of articles.

8. A robot controlling system according to claim 1; including means mounting the detector on the hand for movement therewith.

9. A robot controlling system according to claim 1; wherein the second controlling means includes means for producing operation data effective to move the hand linearly toward the articles without changing the posture of the hand.

10. A robot controlling system according to claim 9; wherein the second controlling means includes means for producing operation data effective to move the hand vertically to act on articles stored in vertical succession.

11. A robot controlling system according to claim 9; wherein the second controlling means includes means for producing operation data effective to move the hand horizontally to act on articles stored in horizontal succession.

12. In a robot controlling system having a robot hand which moves through a moving distance relative to articles stored in succession and is sequentially operated according to operation data, a robot controlling method comprising the steps of:
   detecting the distance between the hand the the last-stored article during the present movement of the hand relative to the article and producing a corresponding detection signal during the movement of the hand toward the article;
   producing a control signal when the level of the detection signal reaches a predetermined level;
   stopping the movement of the hand at a stop position in response to the control signal and removing the hand from the article;
   memorizing a present self-taught data representative of the stop position of the hand;
   calculating the updated operation data representative of the next moving distance of the hand based on the present self-taught data;
   moving the hand at a higher speed toward the article through the next moving distance according to the updated operation data; and thereafter
   moving the hand at a lower speed until the hand stops in response to the control signal.

* * * * *